No. 687,935. Patented Dec. 3, 1901.
LE GRAND KNIFFEN.
MANURE SPREADER.
(Application filed June 3, 1901.)
(No Model.) 6 Sheets—Sheet 1.
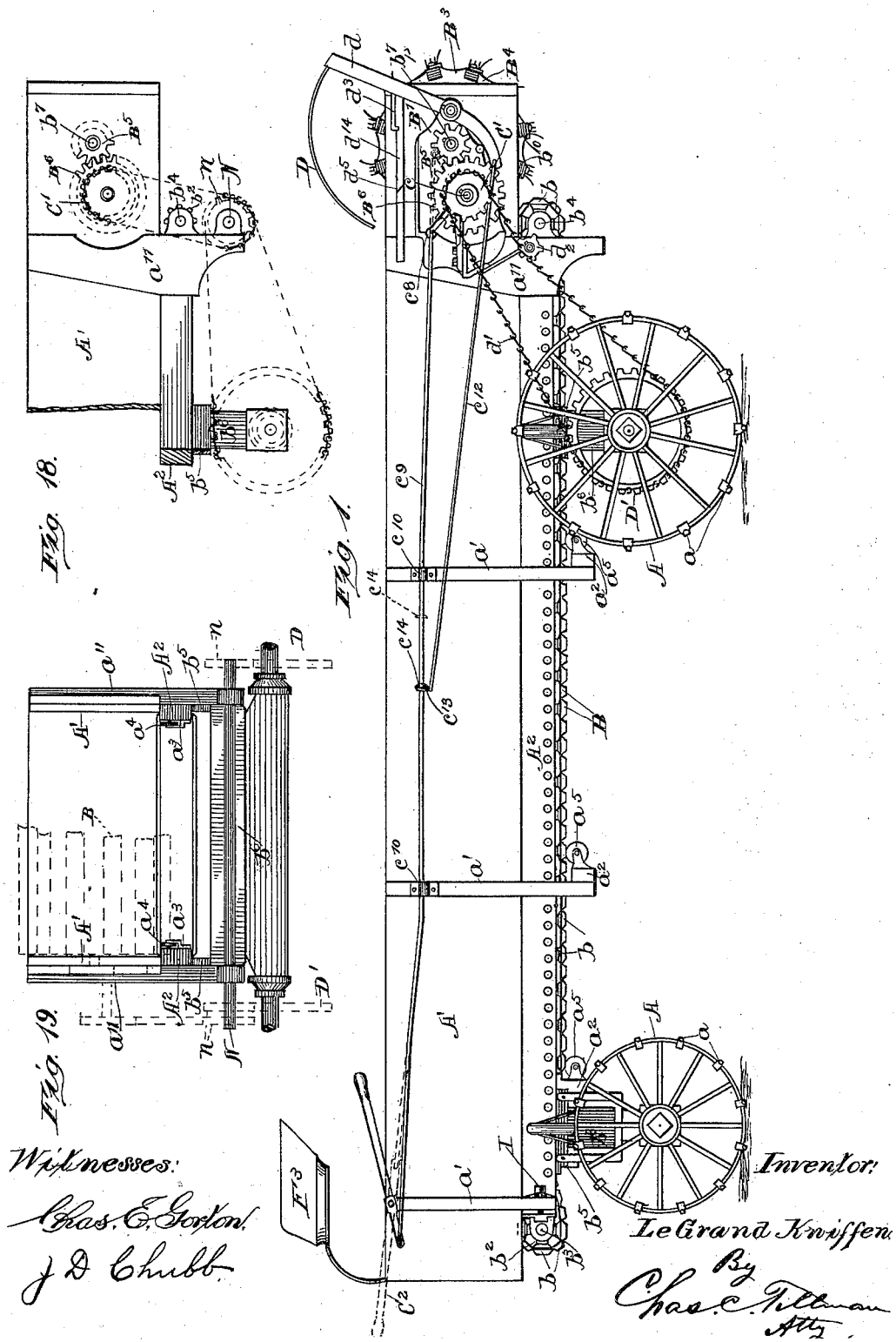
Witnesses:
Chas. E. Gorton
J. D. Chubb
Inventor:
Le Grand Kniffen
By Chas. C. Tillman
Atty.

No. 687,935. Patented Dec. 3, 1901.
LE GRAND KNIFFEN.
MANURE SPREADER.
(Application filed June 3, 1901.)
(No Model.) 6 Sheets—Sheet 2.
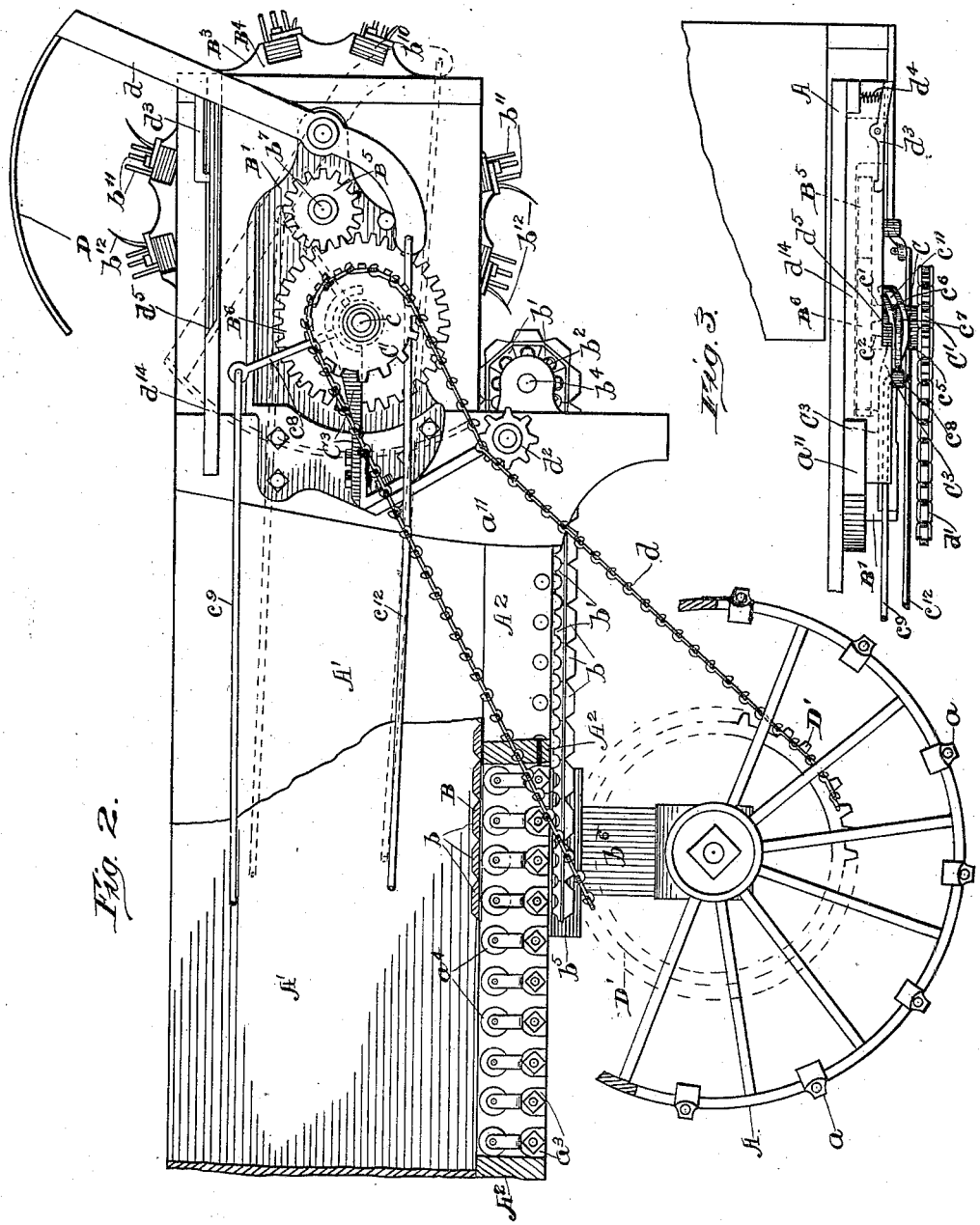
Witnesses:
Chas. E. Gorton.
J. D. Chubb.
Inventor:
Le Grand Kniffen.
By Chas. C. Tillman
Atty.

No. 687,935. Patented Dec. 3, 1901.
LE GRAND KNIFFEN.
MANURE SPREADER.
(Application filed June 3, 1901.)
(No Model.) 6 Sheets—Sheet 3.
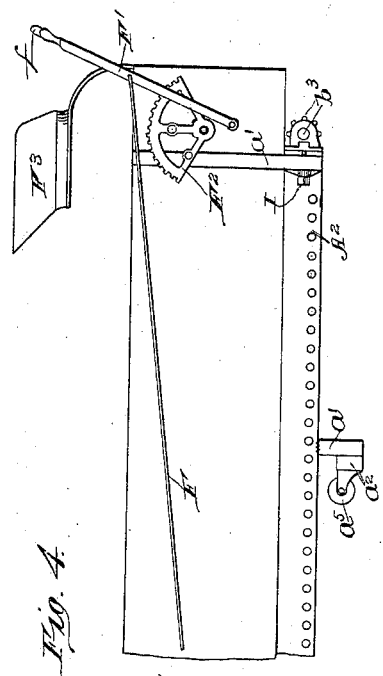
Witnesses:
Chas. E. Gorton.
J. D. Chubb.
Inventor:
Le Grand Kniffen.
By Chas. C. Tillman, Atty.

No. 687,935. Patented Dec. 3, 1901.
LE GRAND KNIFFEN.
MANURE SPREADER.
(Application filed June 3, 1901.)
(No Model.) 6 Sheets—Sheet 4.
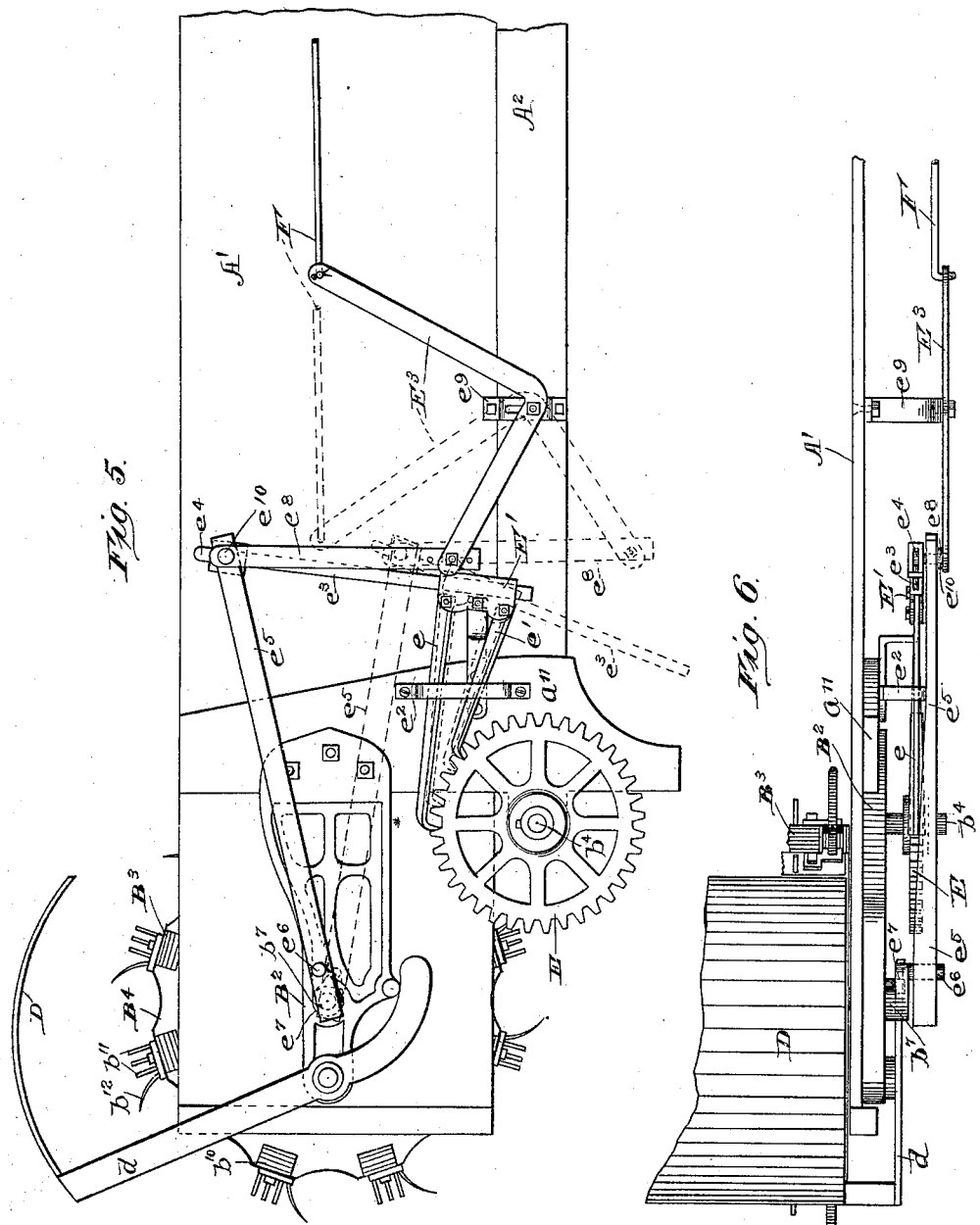

No. 687,935. Patented Dec. 3, 1901.
LE GRAND KNIFFEN.
MANURE SPREADER.
(Application filed June 3, 1901.)
(No Model.) 6 Sheets—Sheet 5.
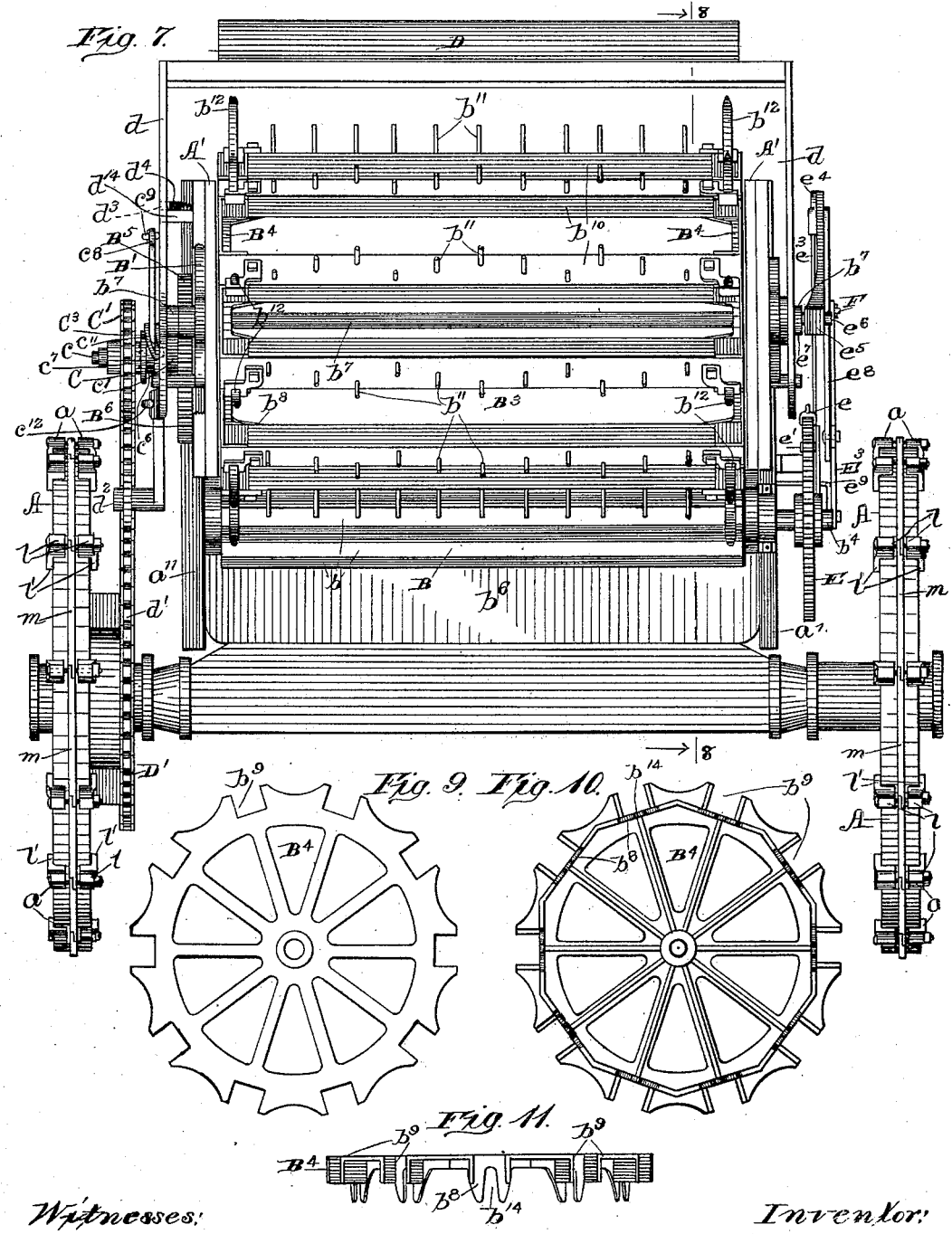

No. 687,935. Patented Dec. 3, 1901.
LE GRAND KNIFFEN.
MANURE SPREADER.
(Application filed June 3, 1901.)
(No Model.) 6 Sheets—Sheet 6.
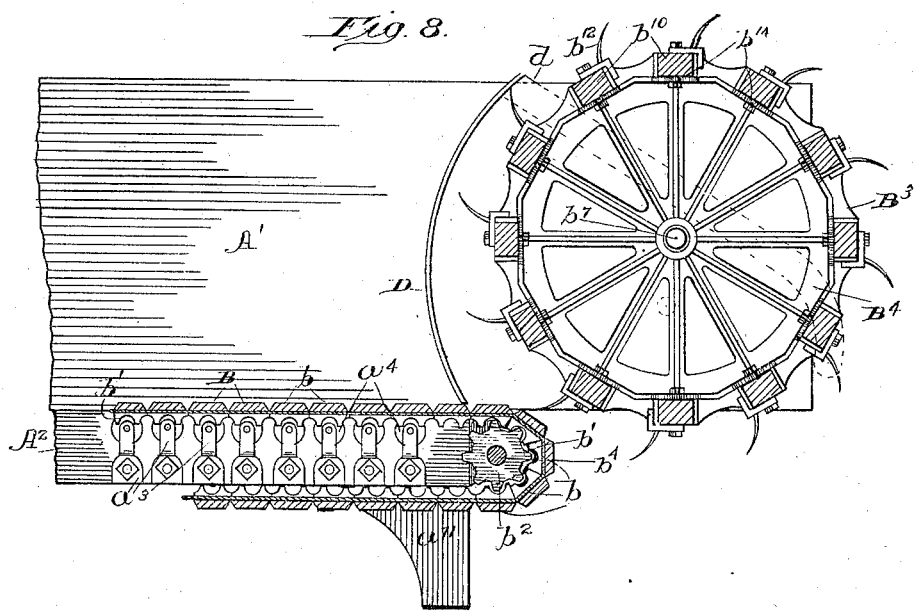
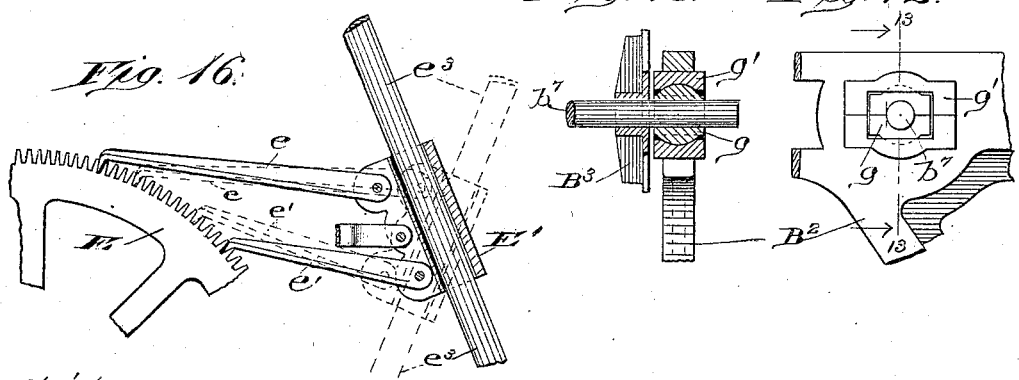
Witnesses:
Chas. E. Gorton.
J. D. Chubb.
Inventor:
Le Grand Kniffen,
By Chas. C. Tillman Atty.

UNITED STATES PATENT OFFICE.

LE GRAND KNIFFEN, OF CHICAGO, ILLINOIS.

MANURE-SPREADER.

SPECIFICATION forming part of Letters Patent No. 687,935, dated December 3, 1901.

Application filed June 3, 1901. Serial No. 62,967. (No model.)

*To all whom it may concern:*

Be it known that I, LE GRAND KNIFFEN, a citizen of the United States, residing at Chicago, in the county of Cook and State of Illinois, have invented certain new and useful Improvements in Manure-Spreaders, of which the following is a specification.

This invention relates to improvements in that type of manure spreaders or distributers in which a box or body is mounted on the running-gear of a wagon and has in its bottom a traveling and endless conveyer which gradually carries the manure toward the rear end of the body, at which end it is cast and distributed from the vehicle by means of a rotary drum, cylinder, or beater having spikes or teeth to engage the manure. In this class of spreaders or distributers the conveyer usually carries an end-gate, which is primarily located at the front end of the wagon-body and serves to push the load of manure rearwardly to the drum or beater as the conveyer travels in said direction, and the drum or beater is generally left unprotected. In loading the manure is piled upon or against the beater and said end-gate, and the teeth of the beater become so embedded in the manure that breakage is liable to occur in starting the machine. Besides, when the machine is started the beater in its first revolution will carry over and deposit in a heap all of the manure that is piled on or against it and with which its teeth engage, and after the conveyer has traveled the length of the wagon-body and the end-gate carried by the conveyer approaches the beater, then again all the manure between said end-gate and beater is carried over by the latter and deposited in a heap. In other words, the manure that is carried over by the beater at the beginning and finishing of the load is deposited in heaps, thus requiring said heaps to be spread over the ground by hand with a fork. Again, in starting the machine in which a rear end-gate is sometimes employed, unless it is raised at or before the conveyer is thrown into gear, damage will occur by reason of the manure being forced back against said end-gate by means of the scraper which the conveyer carries.

To overcome the aforesaid objections is one of the objects of my invention; and I attain said object by employing an endless conveyer in which the end-gate usually carried thereby is dispensed with, whereby all of the manure will be carried back to the beater in such a manner that it will be uniformly distributed and none will be carried over and deposited in heaps, and to protect the beater, so as to prevent the manure being loaded thereon. I employ a curved and pivotal or rotatable shield, which serves the double purpose of a shield for the beater and a wind-break to prevent the lighter particles of manure, &c., being blown away, and which shield is so connected and operated that it may be turned on its axis at the same time and by the same movement of the lever which throws the machine into gear, so that when the machine is started the manure may be carried to the beater by the conveyer.

Other objects and advantages of the invention will be disclosed in the subjoined description.

The invention consists in certain peculiarities of the construction, novel arrangement, operation, and combination of the various parts thereof, as will be hereinafter more fully set forth and specifically claimed; and in order to enable others skilled in the art to which my invention pertains to make and use the same I will now proceed to describe it, referring to the accompanying drawings, in which—

Figure 1 is a view in side elevation of a manure-spreader embodying my invention and illustrating the mechanism for operating the beater and for rotating the shield therefor. Fig. 2 is a view, partly in section and partly in elevation, of the rear portion of the machine, showing like parts and a portion of the conveyer and antifriction-rollers therefor. Fig. 3 is a plan view of a portion of the rear part of the machine. Fig. 4 is a view in side elevation of the opposite side of the box or body of the wagon from that shown in Fig. 1, illustrating the driving mechanism for the conveyer and the means for regulating its movements. Fig. 5 is a view in side elevation of the rear portion of the box or body viewed from the same side shown in Fig. 4, showing like parts and by broken lines the movements of the different parts. Fig. 6 is a fragmental plan view thereof. Fig. 7 is an end elevation of the rear end of the machine. Fig. 8 is a longitudinal sectional view taken on line 8 8 of Fig. 7 looking in the direction indicated by the arrows, showing the shield for the beater in its lowered position, so as to protect the beater while the machine is being loaded. Fig. 9 is an outer end view of one of the beater wheels or heads. Fig. 10 is an inner end view of one of said wheels or heads. Fig. 11 is a plan view thereof. Fig. 12 is a detail view showing the hanger or bearing for the beater-shaft. Fig. 13 is a sectional view taken on line 13 13 of Fig. 12. Fig. 14 is a detail view of a portion of the gear-shift. Fig. 15 is a sectional view of the gear-shift, taken on line 15 15 of Fig. 14. Fig. 16 is a detail view of the regulating mechanism for the conveyer. Fig. 17 is a detail view of the deflector-apron. Fig. 18 is a view in elevation of the rear portion of the machine viewed from one side and showing the beater-shaft geared to a counter-shaft, and Fig. 19 is an end view thereof.

Similar letters refer to like parts throughout the different views of the drawings.

A represents the running-gear of a wagon, which may be of the ordinary or any preferred construction, except that the wheels thereof are preferably provided on their peripheries with traction or friction attachments $a$ for the purpose of preventing them slipping on the ground, as will presently be more fully explained.

Mounted on the running-gear of the wagon is a box or body, the sides $A'$ of which are provided with upward standards $a'$, which extend below the bottom of the body and are united together in pairs at their lower ends by means of cross-ties $a^2$, which standards and ties serve to brace and strengthen the body. Extending longitudinally of the body at its sides are sills $A^2$, to the inner surfaces of which are bolted hangers $a^3$, which carry on their upper ends antifriction-rollers $a^4$, which support the advancing portion of the conveyer B, or that portion thereof on which the manure will rest. Journaled on the ties $a^2$ are antifriction-rollers $a^5$, on which the return or lower portion of the conveyer B will rest. This conveyer is formed of transverse slats $b$, secured together by any suitable flexible material, and have at their ends sprocket-chains $b'$, which pass over sprocket-wheels $b^2$ on the shafts $b^3$ and $b^4$, which shafts are journaled at the front and rear ends, respectively, of the body, and usually on the sills $A^2$ thereof. The conveyer thus mounted forms an endless traveling bottom for the body, and when the machine is in operation will carry the manure from the front of the body toward its rear portion. The sills $A^2$ of the body are provided with downwardly-projecting brackets $b^5$ to rest on the bolsters $b^6$ in order to sustain the body at a sufficient height above the bolsters to permit of the free passage of the conveyer. Secured to the rear portion of the sides of the body and to the main uprights $a^{11}$, near the rear end thereof, are brackets $B'$ and $B^2$, in which the beater-shaft $b^7$ is journaled. The bracket $B'$ affords a hanger for the gears which operate the beater $B^3$, which beater is composed of two wheels or heads $B^4$, mounted near the ends of the shaft $b^7$, and are provided on their peripheries with inwardly-extending ledges $b^8$, having sockets $b^9$ to receive the ends of slats or bars $b^{10}$, which are provided with a series of teeth or spikes $b^{11}$ and $b^{12}$, which latter spikes are located at the ends of the slats or bars and are longer and larger than the intermediate spikes $b^{11}$ or teeth for the purpose of overcoming the friction incident to the manure resting against the sides of the body. The slats or bars $b^{10}$ are secured to the ledges $b^8$ by means of bolts passing through the slots $b^{14}$ of the ledges $b^8$ on the wheels or heads of the beater. On that end of the beater-shaft $b^7$ which is journaled in the bracket $B'$ is keyed a pinion $B^5$, which meshes with a gear $B^6$, mounted on a shaft $c$, journaled in the bracket $B'$. The hub $c'$, Fig. 14, of the gear $B^6$ is provided on its outer surface with a recess $c^2$, to receive a projection $c^3$ on the clutch C, which is loosely mounted on the shaft $c$ and has on its outer surface ratchet-teeth $c^4$ to engage ratchet-teeth $c^5$ on the hub of the sprocket-wheel $C'$, which is keyed to the shaft $c$, as is clearly shown in Fig. 14 of the drawings. The clutch C is provided with an annular groove $c^6$ to receive the shoe $c^7$, which is secured to the lower end of a rod $c^8$, which rod is connected at its upper end to the shipper-rod $c^9$, which is supported by suitable guides $c^{10}$ on the uprights $a'$ and has its front end pivotally connected to a hand-lever $C^2$, fulcrumed near the front end of the body. Secured to the bracket $B'$ and extending rearwardly between the gear $B^6$ and the sprocket-wheel $C'$ and over the clutch C is a guide-arm $C^3$, having a laterally-curved slot $c^{11}$ for the reception and operation of the rod $c^8$, which in conjunction with the rod $c^9$ actuates the shoe $c^7$, and thus throws the clutch C in or out of gear.

Pivotally secured near their lower ends to the brackets $B'$ and $B^2$ are arms $d$, which support at their upper ends a curved shield D, which is shown by continuous lines in its raised position and by dotted lines in its lowered position, Fig. 12, in which latter position it will act as a shield or protector for the beater while the body is being loaded and in the former position as a wind-break to prevent the lighter particles of the manure being scattered or blown away by the wind. One or both of the rear wheels of the wagon is provided with a sprocket-wheel $D'$, over which the sprocket-chain $d'$ passes, which chain also passes over the sprocket-wheel $C'$, thus imparting motion to the gears which drive the beater. The sprocket-chain $d'$ also engages an idler $d^2$, journaled on the rear lower portion of the body, as is shown in Fig. 1 of the drawings. Pivotally secured at one of its ends to the lower end of the arm $d$, which is fulcrumed on the bracket B', is a rod $c^{12}$, the other end of which is movably connected by means of a ring or loop $c^{13}$ to the shipper-rod $c^9$ and normally engages a lug or projection $c^{14}$ on the last-named rod.

Pivotally secured on the upper portion of the body at its rear end is a detent $d^3$ which is pressed outwardly by means of a spring $d^4$, so that it will engage one of the arms $d$ of the shield and hold the same in its raised position. In front of the detent $d^3$ the bar or piece $d^{14}$, to which said detent is secured, is provided with an offset $d^5$, against which the arm $d$ will rest when the shield is in its lowered position.

On the opposite side of the body from that on which the driving mechanism for the beater is located and just above described is the mechanism for regulating the movements of the conveyer B, so as to control the manure as it is fed to the beater, and this mechanism (see Figs. 4, 5, 6, and 16 of the drawings) consists of a toothed gear or ratchet-wheel E, which is keyed to one end of the shaft $b^4$, over which the conveyer passes and which shaft is provided with sprocket-wheels $b^2$ for the chains $b'$ of the conveyer. Pivotally secured near the gear or wheel E is a rocker box or plate E', which has pivotally secured at one of its ends a pawl $e$, the free end of which engages the upper portion of the gear or wheel E, as shown. Pivotally secured at one of its ends to the lower portion of the rocker-box E' is another pawl $e'$, whose free end also engages the teeth of the wheel E below the point of engagement of the upper pawl. These pawls are prevented from being displaced by means of a strap $e^2$, secured to the upright $a^{11}$ of the body. Passing through a suitable opening in the rocker-box E' is a sliding and vibrating bar $e^3$, the upper end of which carries a head $e^4$, which has a pin or stub-shaft $e^{10}$, on which is pivotally secured at one of its ends a pitman $e^5$, the other end of which is connected to a crank-pin $e^6$ of a crank $e^7$ on the end of the beater-shaft $b^7$ opposite that on which pinion B$^5$ is mounted. Pivotally connected at one of its ends to the pin $e^{10}$ on the head $e^4$ is a bar $e^8$, the other end of which is pivotally connected to the shorter arm of a bell-crank lever E$^3$, which is adjustably secured on a bracket $e^9$, fastened to one of the sills A$^2$ of the body.

Connected at one of its ends to the longer arm of the bell-crank lever is a rod F, the other end of which is secured to a hand-lever F', which is fulcrumed on the front portion of the body and is provided with a releasing and retaining grip $f$, of the ordinary construction, to engage a quadrant-gear F$^2$, which is secured to the front portion of the body near the seat F$^3$ for the operator. When the parts are in the positions shown in continuous lines in Figs. 4 and 5 of the drawings, it is apparent that the rocker-box will have a short oscillating or rocking movement, which, through the medium of the pawls $e$ and $e'$, will rotate the gear E very slowly, thus giving a slow movement to the conveyer, but by throwing the lever F' rearwardly, so as to cause the parts to assume the positions indicated by dotted lines in Fig. 5, the rocker-box will have a longer stroke, thus causing the gear E and conveyer to be moved more rapidly. By the use of this mechanism it is evident that a continuous movement of the conveyer is afforded and that said movement may be regulated so as to feed the manure to the beater as, desired.

In Figs. 12 and 13 of the drawings is shown in detail one of the bearings for the beater-shaft $b^7$, which consists of a journal-box $g$, surrounding the shaft and having rounded outer portions to fit in another box $g'$, having a rounded cavity to receive the rounded portion of the first-named box. These bearings are preferably located on the brackets B' and B$^2$ at the rear end of the body and, as is obvious, afford to some extent a universal movement, thus overcoming or counteracting the irregular motion of the machine and keeping the shaft in alinement with its bearing-boxes. To the rear ends of the sides of the body, Fig. 17, is secured by means of arms $h$ a deflector-apron H, which extends across the rear end of the body and upwardly, so as to meet the rear edge of the shield D when in its raised position and downwardly to near the ground. The surface of the apron H adjacent to the body is provided with a number of ribs $h'$ $h^2$ $h^3$ $h^4$, which are adjustably connected to the apron at their upper ends by bolts in openings $h^5$ and at their lower ends by bolts or pins passing through angle-brackets $h^6$ on the ribs and into openings $h^7$ in the lower part of the apron. By employing this apron it is evident that it will prevent the manure being scattered by the wind as it is discharged, and the ribs may be adjusted so as to cause the manure to be deposited broadcast or in one or more rows at the desired distance apart.

Referring again to Fig. 2, it will be seen and understood that when the machine is being loaded the shield D will occupy the position shown by dotted lines to protect the beater and the hand-lever C$^2$ will stand erect. By throwing said lever forward the lug $c^{14}$ on the shipper-rod $c^9$ will strike the loop or ring $c^{13}$ of the shield-rod $c^{12}$ and carry said rod forward, in which operation the shield will be thrown to its raised position, so as to prevent the manure being blown away as it is carried over by the beater, and at the same time and by the same movement the clutch C will be moved outwardly and into gear with the ratchet-wheel C' through the instrumentality of the slotted shipper-guide C$^3$ and its rod $c^8$, which is connected to the rear end of the shipper-rod. When the shield is thus raised, the detent $d^3$ will hold it and the shipper-rod may be moved so as to throw the driving mechanism for the beater in and out of gear independently of the shield-rod.

The shaft $b^3$, over which the conveyer passes at the front of the body, is journaled in movable boxes, so that said shaft may be moved back and forth by means of tighteners I, (which may be of the ordinary belt-tightener type,) so as to give the conveyer the proper tension.

The traction or friction attachments $a$ for the wheels of the wagon are clearly shown in Fig. 7, and consist of a series of members or cleats $l$, which are adjustably secured together in pairs by means of screw-bolts and nuts, so as to cause their sides $l'$ to clamp the tire and felly of the wheel. The pairs of cleats or members are connected together by means of rods $m$, which have holes in their ends for the bolts which connect the members and lie circumferentially on the tires of the wheel, thus holding the members or cleats $l$ across the tire, from which they project so as to engage the earth or ground and prevent the wheels slipping.

In Figs. 18 and 19 I have shown side and end views, respectively, of the rear portion of the machine, in which a counter-shaft N is journaled on the main standards of the body $a^{11}$ and carries sprocket-wheels $n$, which are geared, by means of chains, to the sprocket-wheels D' on the rear wheels of the wagon. The sprocket-wheels $n$ are also geared to the beater-shaft, as shown, thus utilizing the power of the rear wheels of the machine.

Having thus fully described my invention, what I claim as new, and desire to secure by Letters Patent, is—

1. In a manure-spreader, the combination of the body, with a beater journaled at its rear end, an endless conveyer located at the bottom of the body, a tightener for the conveyer, antifriction-rollers journaled on the body so as to support that portion of the conveyer on which the manure rests and the return portion thereof, substantially as described.

2. In a manure-spreader, the combination of the body having a series of upright standards on its sides and extending below its bottom, with cross-ties extending crosswise of the body below the same and uniting said standards in pairs, an endless conveyer located in the bottom of the body, antifriction-rollers journaled so as to support both the advance and return portions of the conveyer, substantially as described.

3. In a manure-spreader, the combination of the body having a series of upright standards on its sides and extending below its bottom with cross-ties uniting said standards below the body, an endless conveyer located at the bottom of the body, a tightener for said conveyer, a series of antifriction-rollers journaled so as to support the advance portion of the conveyer and antifriction-rollers journaled on the said cross-ties to support the return portion of the conveyer, substantially as described.

4. The combination of a wagon having bolsters at its front and rear ends and upright stakes at each end of said bolsters, with a body having on its lower portion downwardly-extending brackets to rest on the bolsters near their stakes, whereby the body is sustained above the bolsters to allow both advancing and returning portions of the conveyer to operate between the body and bolsters, substantially as described.

5. In a manure-spreader, the combination with the body, of a beater-shaft journaled at the rear end thereof and having on one of its ends a crank, a beater on said shaft, a conveyer-shaft journaled at each end of the body, an endless conveyer passing over said conveyer-shafts, a ratchet-wheel or toothed gear on one end of the rear conveyer-shaft, a rocker-box pivotally secured near said ratchet-wheel, pawls secured to the upper and lower portions of the rocker-box and engaging the ratchet-wheel, a sliding and vibrating bar movable vertically through the rocker-box, a pitman connecting the crank of the beater-shaft and the upper end of said bar, and means to raise and lower the said bar, substantially as described.

6. In a manure-spreader, the combination with the body, of a beater-shaft journaled at the rear end thereof and having on one end a crank, a beater on said shaft, a conveyer-shaft journaled at each end of the body, an endless conveyer passing over said conveyer-shafts, a ratchet-wheel or toothed gear on one end of the rear conveyer-shaft, a rocker-box pivotally secured near the ratchet-wheel, pawls secured to the upper and lower portions of the rocker-box and engaging the ratchet-wheel, a sliding and vibrating bar movable vertically through the rocker-box, a pitman connecting the crank of the beater-shaft and the upper end of said bar, a bell-crank lever fulcrumed near the rocker-box, a bar connected to one arm of said lever and to the pitman and sliding bar, a hand-lever fulcrumed at the front of the body and a rod uniting it to the other arm of the bell-crank lever, substantially as described.

7. In a manure-spreader, the combination with a body, of a beater journaled at its rear end, a curved-shaped shield provided with supporting-arms pivoted near the shaft of the beater, whereby the said shield can be rotated from its position in front of the beater where it protects the same while loading, to a raised position where it acts as a wind-break, substantially as described.

8. In a manure-spreader, the combination with a body, of a beater journaled at its rear end, a curved shield having arms pivoted near the beater-shaft, a piece $d^4$, secured to the body and having an offset for one of the arms of the shield, a spring-actuated detent pivoted on said piece to engage the arm of the shield to hold it in its raised position, and a lever connected to one of the arms of the shield to rotate the same, substantially as described.

9. In a manure-spreader, the combination with a body, of a beater journaled at its rear end, gearing to rotate the beater, a shield pivotally secured near the beater, a hand-lever suitably fulcrumed and having a divided connection one branch of which is connected to the shield and the other to a portion of the said gearing, whereby the shield is rotated from its lowered position to its raised position and the machine is thrown into gear by one movement of the said lever, substantially as described.

10. In a manure-spreader, the combination with a body, of the beater and its shaft journaled at the rear end thereof and having on one of its ends a pinion, another shaft c, journaled near one end of the beater-shaft, a gear on the shaft c, to mesh with said pinion and having a recess in its hub, a sprocket-wheel on the shaft c, and having ratchet-teeth on its hub, a ratchet-toothed clutch slidably mounted on the shaft c, between the sprocket wheel and gear thereon and having a projection to extend into the recess thereof and an annular groove, a slotted guide-arm extending over the clutch, a shoe located in the groove of the clutch and having a rod extending through the slot of the guide-arm, a curved shield having arms pivotally secured near the beater-shaft, a hand-lever fulcrumed on the front portion of the body, a shipper-rod connecting said lever and the shoe-rod and having a lug or projection intermediate its ends, another rod connected at one of its ends to one of the arms of the shield and having at its other end a slidable connection with the shipper-rod in front of the lug thereon, substantially as described.

11. In a manure-spreader, the combination with a body, of the beater and its shaft journaled at the rear end thereof and having on one of its ends a pinion, another shaft c, journaled near one end of the beater-shaft, a gear on the shaft c, to mesh with said pinion and having a recess in its hub, a sprocket-wheel on the shaft c, and having ratchet-teeth on its hub, a ratchet-toothed clutch slidably mounted on the shaft c, between the sprocket-wheel and gear thereon and having a projection to extend into the recess thereof and an annular groove, a slotted guide-arm extending over the clutch, a shoe located in the groove of the clutch and having a rod extending through the slot of the guide-arm, a hand-lever fulcrumed on the front portion of the body, and a shipper-rod connecting said lever and the shoe-rod, substantially as described.

12. In a manure-spreader, the combination with a body, of a beater journaled at its rear end, gearing to rotate the beater, a shield pivotally secured near the beater-shaft, a hand-lever suitably fulcrumed on the body, a shipper-rod connecting said lever and a portion of the gearing and carrying a lug or projection intermediate its ends, and another rod connected at one of its ends to one of the arms of the shield and having at its other end a slidable connection with the shipper-rod in front of the lug thereon, substantially as described.

13. In a manure-spreader, the combination with the body, of a curved and pivoted shield at its rear portion, an apron secured across the rear end of the body and extending downward to near the ground and upward to meet the rear edge of the shield when in its raised position, substantially as described.

14. In a manure-spreader, the combination with the body, of a curved and pivoted shield at its rear portion, an apron secured across the rear end of the body and extending down to near the ground and upward to meet the rear edge of the shield when in its raised position, and a series of deflecting-ribs adjustably secured to the surface of the apron adjacent to the body, substantially as described.

15. In a manure-spreader, the combination of the body having at its rear end on each side, a main stake, with the sills supporting the body, antifriction-rollers on said sills, a conveyer at the bottom of the body and supported on said rollers, the brackets B', and B², secured to the main stakes and to the sides of the body and forming the bearing-supports of the beater-shaft and gear therefor, substantially as described.

16. In a manure-spreader, the combination with the body, of a beater journaled on its rear end and having a series of teeth or spikes, the teeth at the ends of the beater being larger and longer than the intermediate teeth and also set forward on the supporting-bars, for the purpose of being brought more forcibly into contact with the manure and to overcome the friction of the manure against the sides of the body, substantially as described.

17. In a manure-spreader, the combination with a box or body similar to a common wagon-body, of suitable appliances to convey the manure to the rear of the box, a beater-shaft supported at either end at the two rear sides of the box, ball-shaped bearing-boxes for said shaft, concave supports for said bearing-boxes, whereby the shaft with its ball-shaped boxes or bearings can move in any direction in said concave supports to overcome any cramping or binding incident to the warping or twisting of the main body of the machine, the whole constructed substantially as described.

LE GRAND KNIFFEN.

Witnesses:
CHAS. C. TILLMAN,
A. GUSTAFSON.